July 17, 1956 W. J. LYONS ET AL 2,755,214
TIRE CORD AND METHOD OF MAKING SAME
Filed July 18, 1952 2 Sheets-Sheet 1
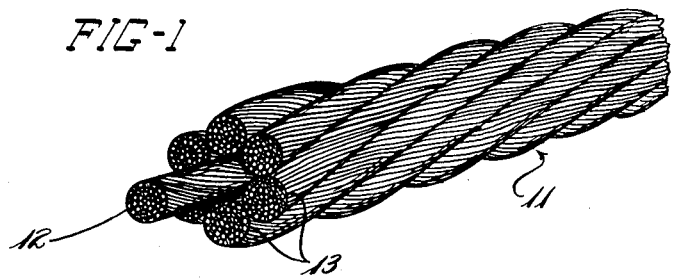
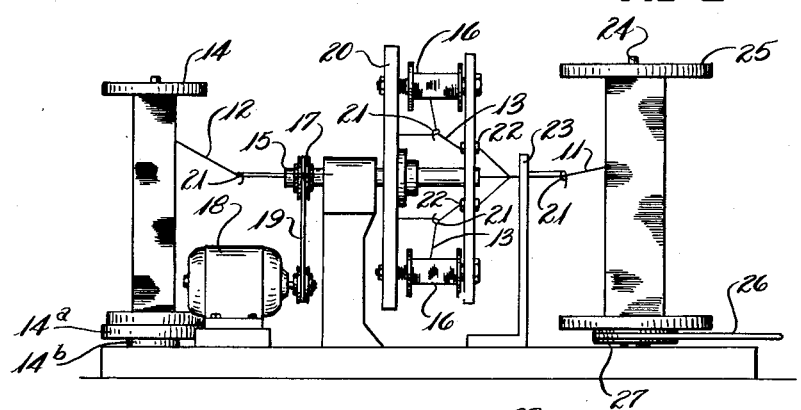
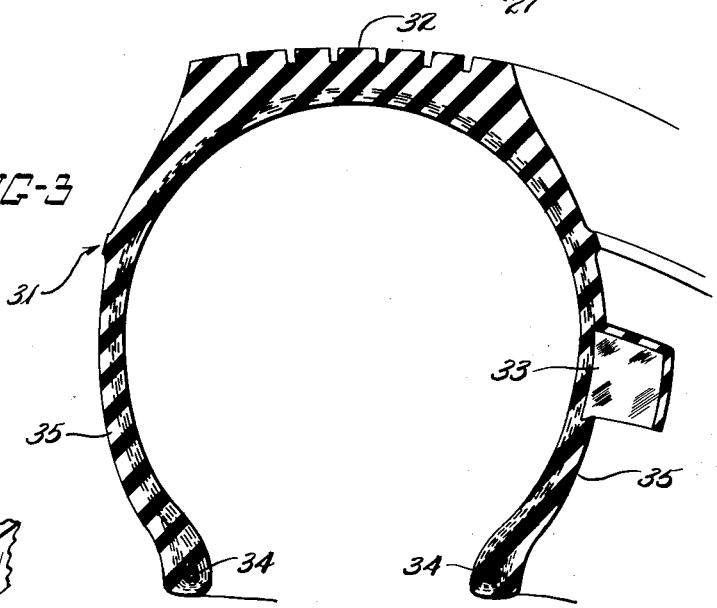
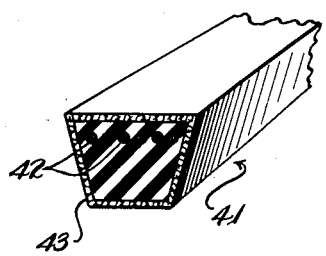
INVENTOR.
WILLIAM J. LYONS
IRVEN B. PRETTYMAN
BY W. A. Fraser
ATTY-

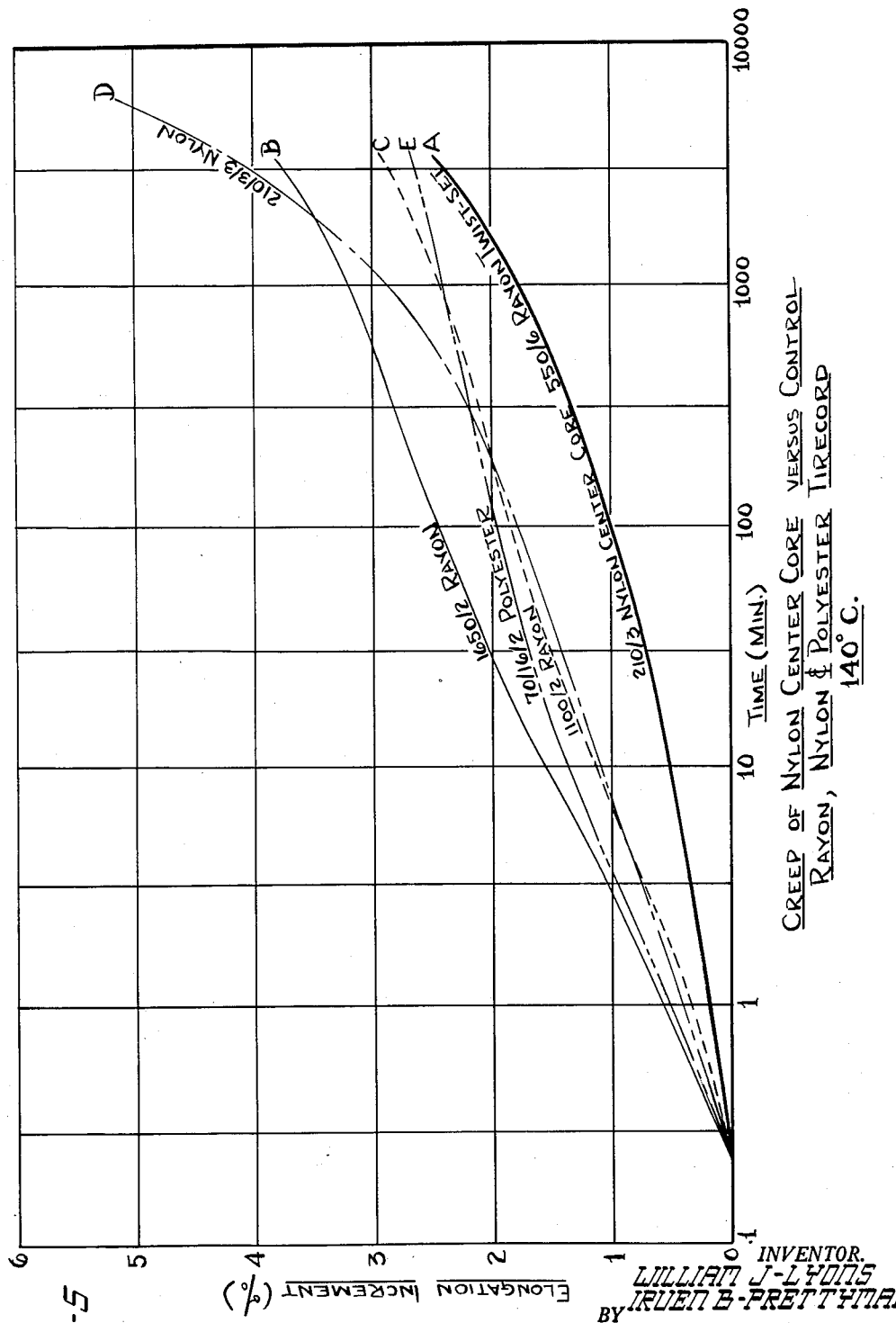

United States Patent Office 2,755,214
Patented July 17, 1956

2,755,214

TIRE CORD AND METHOD OF MAKING SAME

William James Lyons and Irven B. Prettyman, Akron, Ohio, assignors to The Firestone Tire & Rubber Company, Akron, Ohio, a corporation of Ohio Application July 18, 1952, Serial No. 299,582

10 Claims. (Cl. 154—52)

This invention relates to improved reinforced rubber articles, and to improved textile cord and fabric for reinforcing such articles.

In recent years pneumatic tires have been subjected to increasingly severe service conditions. Automotive vehicles travel at greater speeds than formerly and airplanes land at higher and higher speeds. Various attempts have been made to develop pneumatic tires for land vehicles and aircraft, designed to resist the severe impact shocks experienced by tires operating at high speeds or under heavy loads. Some progress has been made in improving the performance of pneumatic tires by substituting rayon tire cord for conventional cotton cord, but the rayon reinforced tires have tended to grow in service. Resistance to impact shock has been improved by substituting nylon fabric for cotton and rayon fabric in airplane tires. However, such nylon fabric tires tend to grow during service more than do tires embodying cotton or rayon fabric, resulting in serious tread and sidewall cracking problems. Also, tires reinforced by nylon or other synthetic polymer filaments in place of cotton or rayon cords often fail because of the lower degree of rubber-fabric adhesion in such tires as compared with conventional cotton and rayon reinforced tires.

It is an object of the invention to provide improved pneumatic tires and other textile reinforced rubber articles characterized by superior performance at high speeds and when subjected to heavy loads in service. Another object is to provide vulcanized reinforced rubber articles having extremely long life when subjected to severe flexing service. Another object is to provide improved textile cord and fabric for reinforcing vulcanized rubber articles. The above and further objects will become apparent in the following description of the invention, and in the accompanying drawing, in which:

Fig. 1 is a fragmentary perspective view, partly in section, of one embodiment of the improved rubber-reinforcing cord of the invention;

Fig. 2 is a diagrammatic elevation of apparatus which may be utilized in constructing the improved textile cord of the invention;

Fig. 3 is a fragmentary perspective view, partly in section, of a portion of a pneumatic tire in accordance with the invention;

Fig. 4 is a fragmentary perspective view, partly in section, of a V-belt in accordance with the invention; and Fig. 5 is a graph showing the improvement of an embodiment of the textile cord of the invention in comparison with rayon, nylon and polyester cords, with respect to growth or "creep."

The objects of the invention are accomplished by providing an improved rubber-reinforcing textile cord comprising a nylon or polyester center core about which several rayon yarns are twisted. An example of the improved textile cord is shown in Fig. 1 and identified by the numeral 11. The cord comprises a core 12 of continuous nylon filament or filaments twisted as shown, or twisted in the opposite direction to that shown. Alternatively, core 12 is untwisted, either when it is made up of a multiplicity of fine nylon filaments as shown, or when it consists of a nylon monofilament. Also, the nylon core may consist of two or more plies of twisted nylon multi-filament singles yarn. Several rayon yarns 13, 13 are twisted around core 12. Six such yarns 13 are shown in Fig. 1, but as few as two or as many as 8 to 12 yarns may be employed if desired. Each yarn 13 consists of a multiplicity of continuous rayon filaments and is a single-ply yarn as shown in Fig. 1 or a 2-ply or multi-ply yarn. The ply twist of the rayon yarn is preferably opposite in direction to the cable twist of the yarns about the core, as shown in Fig. 1, in order to provide a cord which tends toward a balanced construction.

The nylon filament employed in the cord and fabric of the invention is oriented crystalline synthetic linear polyamide filament. One successful commercial nylon is polyhexamethylene adipamide. The invention includes substitution of nylon by oriented crystalline linear polyester filaments, including the polymers obtained by condensation of ethylene glycol and terephthalic acid, commercially known as "Fiber V," "Terylene" and "Dacron."

Referring to Fig. 2, cord 11 may be produced by letting off nylon core 12 under controlled tension from a spool mounted on a spindle 14a carrying braking means 14b, passing the core through a pigtail 21 and then through a hollow shaft 15, and winding about the core a multiplicity of rayon yarns 13, 13 supplied by spools 16, 16. Shift 15 carries a sheave 17, driven by an electric motor 18 through a belt 19. A frame 20 is carried by shaft 15 so as to rotate therewith. Frame 20 is provided with a multiplicity of rayon let-off spools 16, 16, mounted on the frame to rotate with controlled friction in order to let off the rayon yarn under tension as frame 20 is rotated. The rayon yarns 13, 13 pass through pigtails 21, 21 mounted on frame 20, and then through eyelets 22, 22, fashioned of low friction material, such as porcelain, polished metal, nylon or other plastic substance, and are twisted around core 12 as frame 20 is rotated by motor 18, thereby producing the cord 11. Cord 11 is drawn through a support 23 and an associated pigtail 21 onto a wind-up spool 25, rotated by driving means (not shown) through a belt 26 attached to a sheave 27 on one end of spool-carrying spindle 24.

EXAMPLE 1

A nylon center-core cord was produced on apparatus as shown in Fig. 2. The nylon core 12 in this instance was a 210/3 plied nylon yarn. Six 550-denier rayon singles yarns were twisted about the nylon core. The twist of the 550-denier yarns was 17.9 Z turns per inch (T. P. I.), and the twist of the nylon core was 4.8 S T. P. I. For twisting the rubber reinforcing cord 11 of this example, the apparatus of Fig. 2 was adjusted to give a tension of 250 to 300 grams on the center-core 12 and 100 to 130 grams on each of the rayon yarns 13. The twisted cord 11 was twist-set by first wetting with a one per cent aqueous solution of a surface-active agent (Nopco 1921–D) and the wet cord was dried at 280° F. under a tension of four pounds. In Table I the physical properties of the cord of this example are compared with similar properties of conventional rayon tire cord controls.

Table I

| General Description | Control 1 | Control 2 | Example 1 |
|---|---|---|---|
| Cord Construction: | | | |
|   Outside Plies | 1650/2 rayon | 550/6 rayon | 550/6 rayon. |
|   Center-core | none | none | 210/3 nylon. |
| Linear Density (denier) | 3,945 | 4,018 | 4,352. |
| Average Cord Count (ends-cm.$^{-1}$) | 10.23 | 10.23 | 10.23. |
| Gage (mil) | 29.0 | 29.5 | 29.5. |
| Tensile Properties, Conditioned: | | | |
|   Breaking Load (lb.) | 18.0 | 15.3 | 31.3. |
|   Breaking Force (10$^6$ dynes) | 8.01 | 6.81 | 13.90. |
| Tenacity (gm.-denier$^{-1}$) | 2.07 | 1.73 | 3.26. |
| Elongation at Break (percent) | 17.8 | 15.0 | 14. |
| Pendulum Impact Results: | | | |
|   Cord Toughness (10$^6$ erg-cm.$^{-1}$) | 0.896 | 0.779 | 1,218. |
|   Toughness Index (erg-cm.$^{-1}$-denier$^{-1}$) | 227 | 194 | 280. |
| Twist: | | | |
|   Outside— | | | |
|     Ply (T. P. I.) | 12.6 Z | 18.5 Z | 17.9 Z. |
|     Cable (T. P. I.) | 12.3 S | 10.1 S | 6.5 S. |
|   Center-core, Ply (T. P. I.) | | | 4.8 S. |

The tensile properties reported herein were obtained on a standard Scott X-3 cord tester. Conditioned tensile properties were obtained on cords conditioned in the usual manner, by subjecting the cords to an atmosphere maintained at 75° F. and a relative humidity of 55% until the properties of the cords became constant. Oven dried breaking loads were obtained on cords dried in a conventional air oven to equilibrium conditions.

Cord toughness values shown in Table I and again in Table V were obtained on a pendulum or ballistic impact tester of a type similar to that described by Midgley and Pierce in Journal of the Textile Institute, volume 17, page T317 (1926), except that the test cord, instead of being attached to the pendulum bob as in the Midgley and Pierce apparatus, was attached to the sides of the stationary frame of the instrument, having a V-shape and lying in the path of the pendulum bob as the latter fell. From the difference between dial readings of the angles to which the pendulum rose in the latter half of its swing with and without a cord specimen in the path of the pendulum, the amount of energy or work (in ergs) required of the pendulum to break the cord on impact was readily computed. This so-called work of rupture was divided by the length of the cord between clamps, to obtain the cord toughness. Toughness index values, also given in Tables I and V were obtained by dividing the cord toughness values by the linear density of the cord specimen (in deniers). Thus the toughness index gives for the resistance of a cord to an impact break a measure in which the size of the cord is eliminated.

Unexpectedly, the tenacity of the cord of Example 1 is much higher than would be predicted from a consideration of the combined tenacities of the six rayon yarns and one nylon yarn making up the new cord. Table I also shows that the new cord actually possesses lower elongation at break than do either of the conventional rayon tire cords, whereas conventional nylon tire cords have much higher elongation, in the order of 20–25%, resulting in excessive growth exhibited by nylon reinforced tires. Also, the cord toughness and toughness index of the center-core nylon cord of the invention is substantially higher than corresponding properties of the control cords.

EXAMPLE 2

Nylon center-core cord produced as in Example 1 and of the same construction as the cord of Example 1, was compared with a conventional 1650/2 rayon tire cord with reference to (a) resistance to flexing and (b) growth (or creep). The flexing test was conducted on the Firestone Roller Flex machine (Lyons, Analytical Chemistry, volume 23, page 1255 (1952)), used in conjunction with a procedure designed to evaluate cord fatigue. Vulcanized rubber-fabric test straps containing reinforcing cords being tested were flexed in the machine under identical conditions. Then each strap was swollen in toluene, and the test cords were removed. The flexed cords so obtained, as well as unflexed samples of each test cord, were prepared for tensile tests by oven drying. The data are given in Table II.

Table II

| Sample | Test Strap Load | Oven Dried Breaking Load | | Strength Deterioration, percent |
|---|---|---|---|---|
| | | Unflexed, lbs. | Flexed, lbs. | |
| 1650/2 Control | 4.5 | 20.1 | 11.6 | 42.3 |
| Nylon center-core of Example 2 | 4.5 | 27.6 | 27.0 | 2.2 |

EXAMPLE 3

The creep or growth characteristics of another sample of 210/3 nylon center core 550/6 rayon cord produced and twist-set as was the cord of Example 1 were obtained by the method described by Dillon and Prettyman in Journal of Applied Physics, volume 16, page 159 (1945). The cords of the invention were compared with standard 1650/2 rayon tirecords under a load per cord of 5 pounds or 2268 grams and a temperature of 140° C. The elongation increment, using the customary 0.2 minute after application of the load for the initial reading, was obtained as a function of time, the latter expressed logarithmically. The data are plotted in Fig. 5, curve A showing the characteristics of the nylon center core cord and curve B the characteristics of the 1650/2 rayon cord. Data obtained on other samples of the 1650/2 rayon cord under a load of 1913 grams per cord were plotted and found to fall upon curve B. The other curves of Fig. 5 are the results of plotting data similarly obtained on other tirecords, at 140° C. but under a load of 3 pounds per cord. Curve C represents the creep characteristics of a smaller rayon cord of 1100/2 construction; curve D, the characteristics of a commercial 210/3/3 nylon tirecord; and curve F, the characteristics of an experimental 70/16/2 polyester tirecord, the continuous filaments of which were oriented crystalline linear condensation product of ethylene glycol and terephthalic acid, the polyester being commercially known as "Fiber V."

Fig. 5 clearly shows the superiority, as regards creep or growth, of the cord of the invention, when compared to conventional rayon and nylon tirecords and the polyester cord.

EXAMPLE 4

Other cords of the invention were made on the apparatus shown in Fig. 2, with the construction shown in Table III, a control rayon tire cord being included.

Table III

| Sample | Nylon Center Core Construction | Rayon Construction | Twist (T. P. I.) Cable | Twist (T. P. I.) Ply |
|---|---|---|---|---|
| Control | none | 1650/2 | 11.75 | 12.0 |
| A | 210/2 | 550/5 | 6.25 | 18.1 |
| B | 210/3 | 550/5 | 6.78 | 17.1 |
| C | 210/3 | 550/6 | 6.52 | 17.9 |
| D | 210/2 | 1100/3 | 9.25 | 12.0 |
| E | 210/2 | 1100/4 | 6.85 | 11.75 |

The phyiscal properties of the cords identified in Table III are set out in Table IV.

Table IV

| Sample | Gage (mil) Before twist-setting | Gage (mil) Twist-set | Linear Density (denier) | Conditioned Tensiles Breaking Strength (lb.) | Conditioned Tensiles Elongation at Break (percent) | Tenacity (gm.-denier$^{-1}$) |
|---|---|---|---|---|---|---|
| Control | 28.3 | | 3,713 | 19.3 | 16.0 | 2.35 |
| A | 27.5 | 25.0 | 3,485 | 25.3 | 12.5 | 3.29 |
| B | 28.5 | 27.0 | 3,793 | 28.2 | 14.1 | 3.37 |
| C | | 29.0 | 4,460 | 31.5 | 14.7 | 3.20 |
| D | 29.5 | 27.8 | 4,172 | 28.2 | 15.8 | 3.06 |
| E | 32.7 | 31.0 | 5,333 | 37.1 | 15.8 | 3.16 |

EXAMPLE 5

Nylon center core tirecord, as produced in the preceding experiments is woven into weak-wefted tire fabric of otherwise conventional construction and incorporated into the body of a pneumatic tire. Such tire is represented in Fig. 3 by numeral 31, comprising a tread portion 32, body portion 33, bead portions 34, 34 and sidewall portions 35, 35. Body portion 33 is manufactured by impregnating the novel tire fabric of the present invention with a suitable rubber-to-fabric adhesive, calendering a body tire rubber composition thereon, and building a tire body on a tire building machine in the usual manner from bias-cut plies of the calendered fabric. Preformed bead and tread elements are applied to the tire body, the green tire is then shaped and vulcanized in a mold, all in known manner. The tire in accordance with the invention displays much greater resistance to impact shock than do tires comprising conventional tire fabrics of rayon or cotton, while showing no tendency towards the pronounced growth during service exhibited by conventional tires reinforced with nylon or rayon tirecords.

EXAMPLE 6

A fabric reinforced belt, such as V-belt 41 of Fig. 4 is produced in known manner, except that reinforcing rayon covered nylon center core cords 42 produced as in Examples 1-4 are utilized in the body of the belt in place of conventional cords. Such V-belt may contain a cover 43, which may be of fabric woven from cords of the present invention, and thereafter rubberized prior to wrapping around the green V-belt; the assemblage is then vulcanized, preferably in a mold. As an alternative, such V-belt utilizes relatively inextensible cords in the neutral surface of the belt, such as steel wire cords and includes cords produced in accordance with the present invention in the compressible and/or extensible elements of the belt. Such V-belts display much longer life than conventional V-belts, especially when operating under heavy loads and at high speeds.

Adhesion of the cord or fabric of the invention to vulcanize natural or synthetic rubbers is accomplished by impregnating or coating the fabrics or cords with a suitable adhesive. Although organic solvent cements may be employed for this purpose (such as a rubber cement containing polymerized divinylacetylene), aqueous dispersions are generally employed. Natural or synthetic rubber latices containing a dispersed resin are generally used in the tire and fan belt industry to secure adhesion of the fabric to rubber. An example of such adhesive is a mixture of a rubber latex and an aqueous dispersion of a protein, such as casein or soya bean protein. Another example is a natural and/or synthetic rubber latex containing a partially polymerized resorcinol-formaldehyde resin with or without the addition of a butadiene-vinylpyridine copolymer.

EXAMPLE 7

Nylon center core tirecord was produced in the manner of Example 1, except that the nylon center core was first impregnated with an aqueous rubber-protein adhesive, of the type indicated above, prior to twisting the rayon yarns around the core. The physical properties of a 210/3 dipped nylon center core-550/5 rayon cord are given in Table V in comparison with a similar cord with an undipped core and a standard rayon tirecord. It is clear that both nylon center core cords of the invention are substantially better than the rayon cord for impact resistance, with the dipped center core cord being best.

Table V

| Tirecord | Linear Density (denier) | Conditioned Breaking Load in lb. | Cord Toughness ($10^6$ erg-cm.$^{-1}$) | Toughness Index (erg-cm.$^{-1}$ den.$^{-1}$) |
|---|---|---|---|---|
| 1650 rayon | 3,767 | 19.4 | 0.722 | 192 |
| Undipped nylon center core (210/3 nylon-550/3 rayon) | 3,793 | 25.6 | 0.877 | 231 |
| Dipped nylon center core (210/3 dipped nylon-550/3. rayon) | 3,793 | 23.9 | 0.981 | 259 |

The rayon in the cover or outer portion of the cord of the invention is continuous-filament, high-tenacity rayon, which may be manufactured by the viscose process, the cuprammonium process, or the rayon may be made by deesterifying cellulose acetate filaments. The rayon yarns 13 are preferably strong rayon threads having a linear density in excess of 500 denier, constructed by a single twisting operation, the singles twist in turns per inch being not less than the cord twist.

The step of setting the twist of the cord of the invention essentially consists in wetting the rayon yarns of the cord with water and then drying the cord under tension. The tension required is only a fraction of the breaking load of the cord, for example a tension in the range of 5 to 50% of the breaking load of the cord. The cord is wet with plain water, if desired, although the presence of a wetting agent or surface active agent in the water speeds up the wetting of the cord. The surface active agent is not critical, operative examples including anion-active agents, such as rosin soap alkaline salts of sulfonated oils, alkyl sulfates, alkyl sulfonates and alkaryl sulfonates; non-ionic surface active agents, such as the well-known ethylene oxide condensation products; the cation-active surface active agents, such as the many commercial quaternary ammonium salts (but in this case it may be necessary to adjust the properties of a subsequently applied aqueous adhesive to avoid objectionable coagulation of the rubber thereof on the cord).

We claim:

1. A rubber reinforcing textile cord comprising a twisted center core of a plurality of continuous filaments of a condensation product of alkaline glycol and terephthalic acid about which there are twisted a plurality of rayon yarns, each yarn containing a plurality of twisted continuous rayon filaments, the linear density of each yarn being in excess of 500 denier, each yarn having been constructed by a single twisting operation, the singles twist of the yarn in turns per inch being not less than the cord twist.

2. A rubber reinforcing textile cord comprising a twisted center core of a plurality of continuous filaments of an oriented crystalline linear synthetic polymer of the group consisting of the polyamides and polyesters about which there are twisted a plurality of rayon yarns, each yarn containing a plurality of twisted continuous rayon filaments, the linear density of each yarn being in excess of 500 denier, each yarn having been constructed by a single twisting operation, the singles twist of the yarn in turns per inch being not less than the cord twist.

3. A cord as in claim 2, the rayon yarns of which are twist set.

4. A cord as in claim 2, the center core of which is impregnated with a rubber-to-fabric adhesive.

5. Method of making a rubber reinforcing textile cord, which comprises twisting a center core of a plurality of continuous filaments of an oriented crystalline linear synthetic polymer of the group consisting of the polyamides and polyesters, impregnating the center core with a rubber-to-fabric adhesive, and twisting about the center core while the latter is maintained under tension a plurality of rayon yarns, each yarn containing a plurality of continuous rayon filaments.

6. Method of making a rubber reinforcing textile cord, which comprises twisting a center core of a plurality of continuous filaments of an oriented crystalline linear synthetic polymer of the group consisting of the polyamides and polyesters, twisitng about the center core while the latter is maintained under tension a plurality of rayon yarns, each yarn containing a plurality of continuous rayon filaments, and then setting the twist of the rayon yarns about the center core by wetting the cord with water and thereafter drying the cord under tension.

7. A textile reinforced rubber article comprising a rubber portion and reinforcing cords adhered thereto, at least one of the cords conforming to the structure defined by claim 2.

8. A textile reinforced rubber article comprising a rubber portion and reinforcing cords adhered thereto, at least one of the cords conforming to the structure defined by claim 1.

9. A rubber reinforcing textile cord comprising a twisted center core of a plurality of continuous nylon filaments about which there are twisted a plurality of rayon yarns, each yarn containing a plurality of twisted continuous rayon filaments, the linear density of each yarn being in excess of 500 denier, each yarn having been constructed by a single twisting operation, the singles twist of the yarn in turns per inch being not less than the cord twist.

10. A textile reinforced rubber article comprising a rubber portion and reinforcing cords adhered thereto, at least one of the cords conforming to the structure defined by claim 9.

References Cited in the file of this patent

UNITED STATES PATENTS

| | | |
|---|---|---|
| 2,005,539 | Everett | June 18, 1935 |
| 2,225,042 | Elliott | Dec. 17, 1940 |
| 2,258,179 | Hansen | Oct. 7, 1941 |
| 2,433,722 | Weiss | Dec. 30, 1947 |
| 2,436,980 | Standley | Mar. 2, 1948 |
| 2,453,013 | Illingworth et al. | Nov. 2, 1948 |
| 2,465,319 | Whinfield | Mar. 22, 1949 |
| 2,466,808 | Henning et al. | Apr. 12, 1949 |
| 2,468,304 | Musselman | Apr. 26, 1949 |
| 2,483,861 | Weiss | Oct. 4, 1949 |

OTHER REFERENCES

"The New Fibers," Sherman & Sherman (1946), D. Van Nostrand Co., Inc., 250 Fourth Ave., New York; pages 216–218 and 221–222.